United States Patent
Joglekar (10) Patent No.: US 9,760,342 B2
(45) Date of Patent: Sep. 12, 2017

(54) UNDO/REDO IN JAVASCRIPT OBJECT NOTATION

(71) Applicant: International Business Machines Corporation, Armonk, NY (US)

(72) Inventor: Amit P. Joglekar, Olathe, KS (US)

(73) Assignee: International Business Machines Corporation, Armonk, NY (US)

(*) Notice: Subject to any disclaimer, the term of this patent is extended or adjusted under 35 U.S.C. 154(b) by 147 days.

(21) Appl. No.: 15/081,974

(22) Filed: Mar. 28, 2016

(65) Prior Publication Data

US 2017/0153876 A1    Jun. 1, 2017

Related U.S. Application Data

(63) Continuation of application No. 14/953,500, filed on Nov. 30, 2015.

(51) Int. Cl.
  *G06F 9/44*    (2006.01)

(52) U.S. Cl.
  CPC .................................. *G06F 8/315* (2013.01)

(58) Field of Classification Search
  None
  See application file for complete search history.

(56) References Cited

U.S. PATENT DOCUMENTS

| | | | |
|---|---|---|---|
| 7,870,482 B2 | 1/2011 | Gnech et al. | |
| 8,533,665 B2 | 9/2013 | Yu et al. | |
| 8,805,984 B2 | 8/2014 | Markus et al. | |
| 2012/0246190 A1 | 9/2012 | Surtani et al. | |
| 2013/0166568 A1 | 6/2013 | Binkert et al. | |
| 2014/0040790 A1* | 2/2014 | Nurse | G06F 8/38 715/762 |
| 2014/0067866 A1 | 3/2014 | Chen | |

FOREIGN PATENT DOCUMENTS

CN    102904887 B    1/2016

OTHER PUBLICATIONS

MacWright, Tom, "Simple undo in JavaScript with Immutable.js", macwright.org, Posted May 18, 2015, 6 pages, <http://www.macwright.org/2015/05/18/practical-undo.html>.

(Continued)

*Primary Examiner* — Qamrun Nahar
(74) *Attorney, Agent, or Firm* — Christopher McLane (57) ABSTRACT

The method includes modifying a Javascript object notation structure to include a tag on at least one object and a tag on at least one array containing a first version of the Javascript object notation structure. The method includes in response to identifying a changed second version of the Javascript object notation structure, adjusting the tag on the at least one object and the tag on the at least one array to include the second version of the Javascript object notation structure. The method includes adjusting the displayed first version of the Javascript object notation structure with the second version of the Javascript object notation structure. The method includes in response to receiving data indicating an undo/redo action, adjusting the displayed second version of the Javascript object notation structure to the first version of the Javascript object notation structure.

1 Claim, 4 Drawing Sheets

(56) References Cited

OTHER PUBLICATIONS

"JSONObject (Apache Sling Aggregate 5-incubator API)", Copyright 2007-2009, Downloaded Mar. 31, 2015, 15 pages, <https://sling.apache.org/apidocs/sling5/org/apache/sling/commons/json/JSONObject.html>.

"JSON API:: Format", 18 pages, Generated on Mar. 29, 2015, <http://jsonapi.org/format/>.

"Introducing JSON", ECMA-404 the JSON Data Interchange Standard, 6 pages, Downloaded Mar. 31, 2015, <http://www.json.org/>.

Joglekar et al., "Undo/Redo in Javascript Object Notation", U.S. Appl. No. 14/953,500, filed Nov. 30, 2015, 29 pages.

Appendix P, List of IBM Patents or Patent Applications Treated as Related, 2 pages, dated Jul. 26, 2016.

\* cited by examiner

```
1 JSONObject object = new JSONObject( "{"a" : {"p" : 8}, "b" : [1, 2, 3]}" );
2
3 JSONUndoRedoRecorder recorder = new JSONUndoRedoRecorder( object );
4
5 recorder.insertValueAtIndex( object.getJSONArray( "b" ), 3, new JSONObject( "{"i" : "str"}" ) );
6
7 recorder.setValueAtIndex( object.getJSONArray( "b" ), 1, object.getJSONObject( "a" ) );
8
9 recorder.removeNameValuePair( object, "b" );
10
11 recorder.undo();
12
13 recorder.redo();
```

FIG. 3

```
1 JSONObject object = new JSONObject( "{\"a\" : 2}" );
2
3 JSONUndoRedoRecorder recorder = new JSONUndoRedoRecorder( object );
4
5 recorder.setNameValuePair( object, "a", new JSONObject( "{\"i\" : \"str\"}" ) ); // Change existing name-value
6
7 recorder.addNameValuePair( object, "b", 3 ); // Add new name-value
8
9 recorder.removeNameValuePair( object, "a" ); // Remove a name-value
```

UNDO/REDO IN JAVASCRIPT OBJECT NOTATION

BACKGROUND OF THE INVENTION

The present invention relates generally to JavaScript Object Notation, and more particularly to undo and redo actions within JavaScript Object Notation.

JavaScript™ Object Notation (JSON) is an open standard format that uses human-readable text to transmit data objects consisting of attribute value pairs and ordered list of values. It is used primarily to transmit data between a server and web application as an alternative to eXtensible Markup Language (XML). Although originally derived from the JavaScript scripting language, JSON is a language-independent data format. Code for parsing and generating JSON data is readily available in many programming languages.

JSON generally ignores any whitespace around or between syntactic elements (e.g., values and punctuation, but not within a string value). However, JSON only recognizes four specific whitespace characters: the space, horizontal tab, line feed, and carriage return. JSON does not provide or allow any sort of comment syntax.

SUMMARY

Embodiments of the present invention disclose a method, computer program product, and system for undoing and redoing changes in a Javascript object notation structure. In one embodiment, in accordance with the present invention, the computer-implemented method includes modifying, by one or more computer processors, a Javascript object notation structure to include a tag on at least one object and a tag on at least one array containing a first version of the Javascript object notation structure. The method further includes identifying, by one or more computer processors, a change to the Javascript object notation structure creating a second version of the Javascript object notation structure. The method further includes adjusting, by one or more computer processors, the tag on the at least one object and the tag on the at least one array to include the second version of the Javascript object notation structure. The method further includes adjusting, by one or more computer processors, the displayed first version of the Javascript object notation structure with the second version of the Javascript object notation structure. The method further includes receiving, by one or more computer processors, data indicating an action, wherein an action includes a undo/redo action to the Javascript object notation structure to return the second Javascript object notation structure to the first version of the Javascript object notation structure. The method further includes adjusting, by one or more computer processors, the displayed second version of the Javascript object notation structure to the first version of the Javascript object notation structure.

DETAILED DESCRIPTION

Embodiments of the current invention create a concise representation of changes in JavaScript™ object notation (JSON) format. Embodiments of the invention recognize JSON is considered a concise format when compared to other relatively verbose prior formats. Embodiments of the invention recognize string representation of a JSON structure is very compact and hence easily transferable and sharable and storable. Embodiments of the invention recognize use of JSON for change representation is advantageous. For the purposes of this application "a collection of attribute-value pairs" is referred to as 'JSON object' and "ordered list of values" is referred to as 'JSON array.'

Implementation of embodiments of the invention may take a variety of forms, and exemplary implementation details are discussed subsequently with reference to the Figures.

Figure 1:
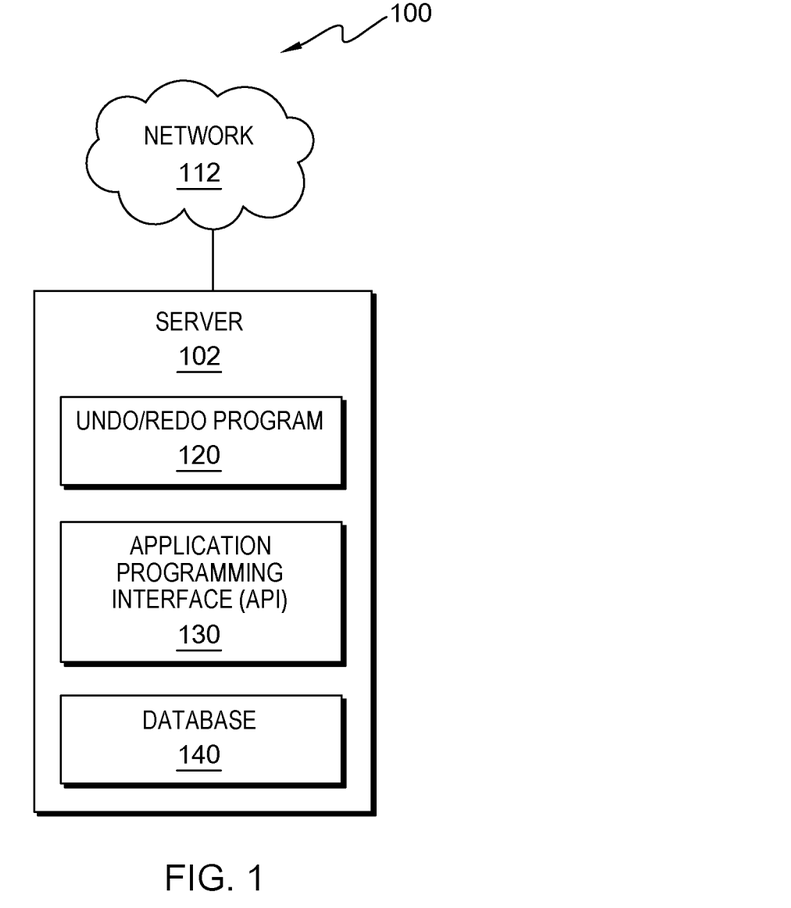
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102, connected to network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving, analyzing, and sending data. In this embodiment, server 102 tracks changes to JavaScript™ Object Notation (JSON) format. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with network 112. In another embodiment, server 102 represents a computing system utilizing clustered computers and components to act as a single pool of seamless resources. Server 102 may include components, as depicted and described in further detail with respect to FIG. 5, in accordance with embodiments of the present invention. Server 102 includes undo-redo program 120, application programming interface (API) 130, and database 140.

In depicted distributed data processing environment 100, undo/redo program 120 resides on server 102 and may undo and redo actions to JSON. In various embodiments, undo/redo program 120 prepares a JSON structure and tracks changes made to the JSON structure and allows undo and redo actions based on the tracked changes. In some embodiments, undo/redo program 120 may monitor changes to a JSON on server 102 or changes to a JSON on another computing device (not depicted), via network 112. In an example, another computing device (not depicted) may have a JSON which is monitored by undo/redo program 120. In another embodiment, undo/redo program 120 may monitor databases and/or storage devices located on server 102 or another computing device to enable undo/redo program 120 to monitor changes to the JSON located in the database and/or storage devices. In some embodiments, undo/redo program 120 monitors multiple JSON. Undo/redo program 120 is depicted and described in further detail with respect to FIG. 2.

In depicted distributed data processing environment 100, API 130 resides on server 102. API 130 is a set of routines, protocols, and tools for building software applications. API 130 specifies how software components should interact and API 130 may be utilized when programming graphical user interface (GUI) components between a user and undo/redo program 120. In various embodiments, API 130 may contain functions that can be called upon to prepare a JSON for tracking changes (e.g., startUndoRedoTracking( ) and stopUndoRedoTracking( )), functions that can be utilized for tracking the changes (e.g., setNameValuePair( ), insertValueAtIndex( )) as well as functions for undoing or redoing changes (e.g. undo( ), redo( ). In some embodiments, API 130 may represent multiple APIs or work in conjunction with APIs not depicted.

In the depicted embodiment, database 140 resides on server 102. In another embodiment, database 140 may reside elsewhere in distributed data processing environment 100, such as within one or more additional server(s) or devices (not shown), or independently as a standalone database that is capable of communicating with server 102 via network 112. A database is an organized collection of data. Database 140 is implemented with any type of storage device capable of storing data that is accessed and utilized by server 102, such as a database server, a hard disk drive, or a flash memory. In other embodiments, database 140 represents multiple storage devices within server 102. Database 140 stores information, such as JSON files containing changes, various versions of JSON files, etc. In an example, database 140 stores information generated by undo/redo program 120.

Figure 2:
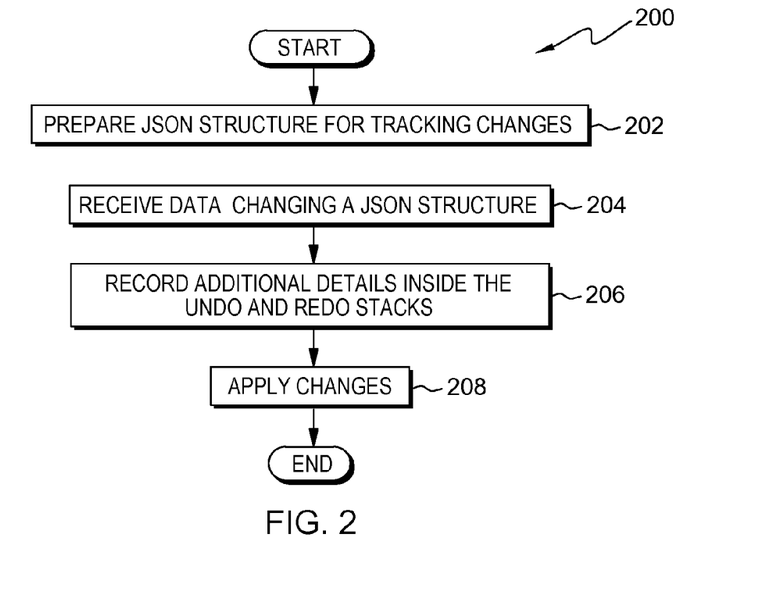
FIG. 2 is a flowchart depicting operational steps of a program for undoing and redoing actions within the distributed data processing environment of FIG. 1, in accordance with an embodiment of the present invention.

FIG. 2 is a flowchart depicting operational steps of program 200, which is a function of undo/redo program 120, in accordance with an embodiment of the present invention. Program 200 operates on server 102 and tracks changes to a JSON file and enables undoing and redoing actions. In various embodiments, program 200 may track changes in multiple JSON files. In one embodiment, an administrator of undo/redo program 120 initiates the operational steps of program 200. In an example, a user of undo/redo program 120 initiates program 200 when the user begins to modify a JSON file. In another embodiment, undo/redo program 120 may initiate the operational steps of program 200 after a user of program 200 prompts program 200 to begin tracking changes to a JSON file.

Program 200 prepares the JSON structure for tracking changes (step 202). In some embodiments, an API may invoke the prepare operation (e.g., API named startUndoRedoTracking(JSON)). In various embodiments, program 200 tags the objects (i.e., collection of attribute-value pairs) and arrays (i.e., ordered list of values) in the JSON structure to enable recording of the future changes to the JSON structure. In some embodiments, program 200 recursively traverses objects and arrays inside the JSON structure's hierarchy and adds an identifier to each object and array. In an example, a special name-value pair (e.g., named JSON_ID) is used as identifier for an object or array.

In the example, JSON_ID enables program 200 to identify current positions of objects or arrays in the JSON structure. In some embodiments, the value corresponding to the JSON_ID (e.g., named JSON_ID) is a string that indicates the path in a JSON structure that must be traversed to reach an object or array. In an example, a language specific JSON implementation may hide such a name-value pair stored in JSON object by ignoring the JSON_ID name-value pair in an application programing interface (API) (e.g., object.getAllNames( ) or object.toString( )). In some embodiments, identifier (e.g., named JSON_ID) for a JSON array is stored inside a special JSON object stored in the last array index. In an embodiment, the last array index is used so the element does not affect the index that needs to be specified during insert/remove/move operations on the array elements. In an example, a language specific JSON implementation may hide such an element stored in the last array index by ignoring the element in an array application programing interface (API) (e.g., array.length( ) or array.toString( )). In an example, a value for an identifier (e.g., named JSON_ID) starts with the string "/JSON_ROOT/" and has "/" separated elements that must be traversed to reach an element whose JSON_ID is being created.

In another example, name in a name-value pair in an object and array-index in an array are used to compose the JSON_ID. In the previous example, JSON_ID may be assigned to elements in the JSON {"a": 1, "b": [2, {"x": 30, "y": [32, 35, 38] }, 4], "c": [5, 6] } as follows: The topmost object {"a": 1, . . . } gets the JSON_ID "/JSON_ROOT/", the array [2, 1"x": 30, . . . ] gets the JSON_ID "/JSON_ROOT/b/", the object {"x": 30, . . . } gets the JSON_ID "/JSON_ROOT/b/[1]/" (assuming zero based array indexes, index of '2' in the array is 0, whereas the index of object {"x": 30, . . . } is 1). Similarly, array [32, 35, . . . ] gets the JSON_ID "/JSON_ROOT/b/[1]/y/" and so on. In an example, JSON_IDs of objects and arrays are maintained (i.e., inserted/removed/changed) as necessary by API 130; an API that may process addition of new objects and arrays to the JSON structure whose changes are being tracked (e.g., addNameValuePair( ), insertValueAtIndex( ) etc.) may set the JSON_ID for newly added objects or arrays; an API that may process removal of an object or array from the JSON structure whose changes are being tracked (e.g., removeNameValuePair( ), removeValueAtIndex( ) etc.) may remove the JSON_ID from the removed objects or arrays; an API that may process moving of an object or array within the JSON structure whose changes are being tracked (e.g., moveValueAtIndex( )) may remove the previous JSON_ID from the object or array being moved and add a new JSON_ID based on the new position of the object or array being moved. In an example, an API may set more than one identifiers for objects and arrays in order to support programmatic copying of an existing object or array in the JSON structure whose changes are being tracked to some other position inside the JSON structure. Such multiple identifiers may be set using a JSON array of strings as the value for the identifier name-value pair (e.g., named JSON_ID). In some examples, a file may not be in JSON, and program 200 converts the file into a JSON file before adjusting the JSON structure for the file.

In various embodiments, program 200 utilizes undo and redo stacks to enable later changes to the JSON structure. In an example, undo and redo stacks are implemented using JSON array; the values pushed on to the stacks also contain JSON arrays and JSON objects along with primitive types supported in JSON, such as strings, numbers, true and false, which enables undo/redo stacks to be easily transferable, sharable, and storable in the form of simple JSON strings. In an example, JSON arrays are used as undo and redo stacks by adding new elements and retrieving existing elements from the same extremity of the JSON array.

In some embodiments, a JSON object or JSON array assigned to a name or index may be new or pre-existing (e.g., programmatically moved or copied from some other place in the hierarchy of the JSON structure whose changes are being tracked). In an embodiment, one may make updates to put existing JSON objects and/or JSON arrays inside the hierarchy of new JSON objects and/or JSON arrays and vice versa. In one example, program 200 may put a "JSON_ID" stamp on existing JSON objects and/or JSON arrays in a JSON structure when undo and redo tracking is turned on. Next, program 200 may put a "JSON_ID" stamp on newly added JSON objects and/or JSON arrays. Next, program 200 may remove "JSON_ID" stamp from removed/replaced JSON objects and/or JSON arrays.

Program 200 receives data changing a JSON structure (step 204). In various embodiments, program 200 may receive data changing a JSON structure via API 130. For example, setNameValuePair(JSON object, name, value), removeNameValuePair(JSON object, name), insertValueAtIndex(JSON array, index, value) etc. API 130 may also contain API (e.g. undo( ) and redo( )) for performing undo or redo operation based on the information stored in undo and redo stacks. In some embodiments, program 200 may receive changes from an API (e.g., API 130) and make the changes to a JSON after receiving data from a user interface (UI) indicating a user is changing the JSON file. In another embodiment, program 200 may monitor a JSON for changes occurring to the structure. In some embodiments, program 200 may proceed to step 206 after each change to a JSON file that is detected by program 200 via an API (e.g., API 130).

In some embodiments, an undo and a redo API (e.g., API 130), or an API, which is a function of program 200, may be invoked directly as method calls. In other embodiments, implementation of undo and redo operations may utilize methods known in the art, such as wrapping the undo and redo method calls inside event handlers for some key combinations (e.g., Ctrl-Z for undoing one step at a time.)

Program 200 may record additional details inside the undo or redo stack (step 206). In some embodiments, program 200 records additional details inside the undo or redo stack when program 200 receives data changing a JSON structure through an API (e.g., API 130). In an example, if the JSON structure is changed using one of the APIs changing a JSON object (e.g., setNameValuePair( ), removeNameValuePair( )) or the APIs changing a JSON array (e.g., insertValueAtIndex( ), removeValueAtIndex( ) etc.), then details for reversing the change are stored in the undo stack. In another example, if the JSON structure is changed using the API for undoing a previous change (e.g., undo( ) API that applies a change stored in the undo stack), then details for reversing the change are stored in the redo stack. In yet another example, if the JSON structure is changed using the API for redoing a change that was previously undone (e.g., redo( ) API that applies a change stored in the redo stack), then details for reversing the change are stored in the undo stack. In various embodiments, each entry in an undo and a redo stack is a JSON array having two elements. The first element is a string which is the JSON_ID of the JSON object or the JSON array where an undo or redo action may occur. The second element is a JSON object or JSON array that contains information about the undo or redo action that may occur.

In some embodiments, a JSON object may store information regarding undo and redo changes to a JSON object. In an example, when a change occurs to an existing name-value pair (e.g., using setNameValuePair( ) API), the reversal (i.e. resetting to the previous value) is recorded using a name-value pair where the name is same as the name whose value was changed and the value is the previous value. In an example in FIG. 4 (containing lines 1-9), program 200 records previous value of a name-value pair (e.g., 2) to the undo stack during processing of line 5 (e.g., entry ["/JSON_ROOT/",{"a":2}] on the undo stack). In another example, when a new name-value pair is added (e.g., using addNameValuePair( ) API), the reversal (i.e. removal) is recorded using a name-value pair where the name is "REMOVE_NAME" and the value is the name to be removed. In an example in FIG. 4, program 200 records removal of a name-value pair to the undo stack during processing of line 7 (e.g., entry ["/JSON_ROOT/",{"REMOVE_NAME": "b"}] on the undo stack). In yet another example, when an existing name-value pair is removed (e.g., using removeNameValuePair( ) API), the reversal (i.e., adding the name-value pair back into the JSON structure) is recorded using a name-value pair where name is same as the name being removed and value is same as the value being removed. In an example in FIG. 3 (lines 1-13) when recording the previous value or the value being removed, program 200 records the value 'as is' if the value is of a simple type, such as string, number, boolean etc., such as during processing of line 5. In an alternate example in FIG. 4, if the value is a non-simple type, such as a JSONObject or a JSONArray, then program 200 records a copy of the JSONObject or JSONArray, such as during processing of line 9 where the whole JSON object is copied to the undo stack (e.g., JSON object named "a", i.e. {"i":"str"}, in the entry ["/JSON_ROOT/",{"a":{"i":"str"} }] on the undo stack). In the example, at the end of processing of line 9, undo stack may have three entries, such as [["/JSON_ROOT/", {"a": {"i": "str" }}],["/JSON_ROOT/",{"REMOVE_NAME":"b" }], ["/JSON_ROOT/",{"a":2}]], in an order such that first entry corresponds to the latest change and last entry corresponds to the oldest change.

In some embodiments, a JSON array is used for storing information regarding undo and redo changes to a JSON array. In an example, if a change to an existing array element occurs (e.g., using setValueAtIndex( ) API), the reversal (i.e., resetting to the previous value) is recorded using a JSON array, the array contains: "S" at index 0 (indicating 'set' operation), the changed index at index 1, the previous value at index 2. In an example in FIG. 3, program 200 records previous value of index 1 (e.g., 2) to the undo stack during processing of line 7 (e.g., entry ["/JSON_ROOT/b/",["S",1,2]] on the undo stack). In another example, if an inserted array element occurs (e.g., using insertValueAtIndex( ) API), the reversal (i.e., removal of the array index) is recorded using a JSON array, the array contains: "R" at index 0 (because remove operation is the opposite of insert operation) and index to be removed at index 1. In an example in FIG. 3, program 200 records removal of index 3 to the undo stack during processing of line 5 (e.g., entry ["/JSON_ROOT/bV",["R",3]] on the undo stack). In an example, if a removed array element occurs (e.g., using removeValueAtIndex( ) API), the reversal (i.e., adding back of the array element) is recorded using a JSON array, the array contains: "I" at index 0 (indicating 'insert' operation), the index to be inserted at index 1, the value to be inserted at index 2. In another example, if a moved array element occurs (e.g., using moveValueAtIndex( ) API), the change-array contains: "M" at index 0 (indicating the 'move' operation), the new index at index 1, the current index at index 2. When recording the previous value or the value being removed, program 200 records the value 'as is' if the value is of a simple type, such as string, number, boolean etc., such as the integer 2 during processing of line 7 in FIG. 3 where entry ["/JSON_ROOT/b/",["S",1,2]] is put on the undo stack; whereas if the value is a non-simple type such as a JSON object or a JSON array, then program 200 records a copy of the JSON object or JSON array.

Program 200 applies changes (step 208). In some embodiments, program 200 applies changes using the change information captured in undo and redo stacks. In an example, undo( ) API may be used for applying changes stored in the undo stack and redo( ) API may be used for applying changes stored in the redo stack. In various embodiments, program 200 applies changes in undo and redo stacks to the same JSON structure whose changes are being tracked. In another embodiment program 200 applies changes to a copy of the JSON structure whose changes are being tracked. In an example, program 200 creates a copy of undo and redo stacks and uses those stacks for applying changes to a copy of the JSON structure, so that the undo-redo stacks for the JSON structure whose changes are being tracked remain separate from the undo-redo stacks for copy of the JSON structure. In some embodiments, multiple changes to the JSON structure may occur before program 200 applies changes to the JSON structure or a copy of the JSON structure. As described in a previous section, "In various embodiments, each entry in an undo and a redo stack is a JSON array having two elements. The first element is a string which is the JSON_ID of the JSON object or the JSON array where an undo or redo action may occur. The second element is a JSON object or JSON array that contains information about the undo or redo action that may occur." In an embodiment, when applying a change from undo or redo stack to the JSON structure, program 200 may use the JSON_ID (first element) to traverse the JSON structure to identify the JSON object or the JSON array where the undo or redo action may occur, and then use the information stored in the second element to apply the undo or redo change to the JSON object or the JSON array.

As described in a previous section, "In various embodiments, each entry in an undo and a redo stack is a JSON array having two elements. The first element is a string which is the JSON_ID of the JSON object or the JSON array where an undo or redo action may occur. The second element is a JSON object or JSON array that contains information about the undo or redo action that may occur." In some embodiments, program 200 may use JSON_ID in the second element as well when representing a change that contains objects and arrays that may have been programmatically copied to/from some other location in the JSON structure whose changes are being captured. In an example in FIG. 3, during processing of line 9, when program 200 copies the JSON array named "b" to the undo stack (e.g., entry ["/JSON_ROOT/", {"b":[1,"/JSON_ROOT/a/",3, {"i":"str"}]}] on the undo stack), the JSON_ID "/JSON_ROOT/a/" is used because that element in the JSON array is a programmatic copy of JSON object named "a" (the JSON object {"p": 8} in the example); the copying was done during processing of line 7. When applying a change from undo or redo stack (step 208), if program 200 encounters a JSON_ID such as one from the previous example, program 200 copies that object/array as is from the JSON structure to which the change is being applied. In the example, during processing of undo operation at line 11, program 200 copies object having identifier "/JSON_ROOT/a/" (the JSON object {"p": 8}) at second position in the JSON array named "b" when adding back the name-value pair.

Figure 3:
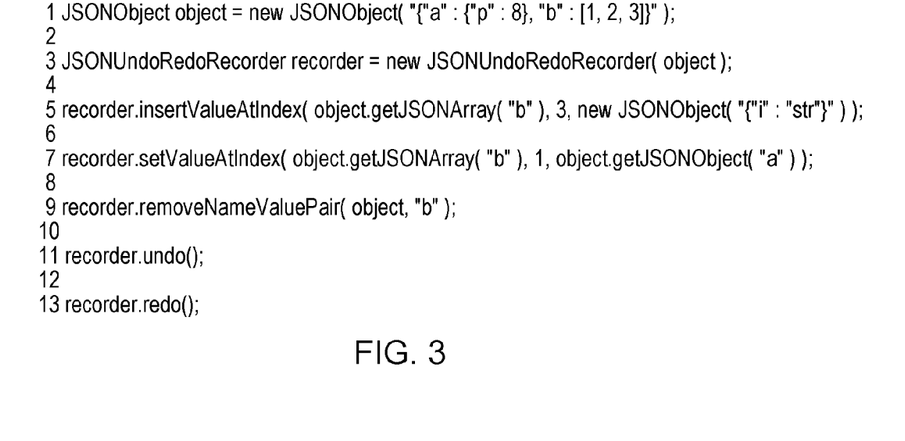
FIG. 3 represents an example of code utilized, in accordance with an embodiment of the present invention.
Figure 4:
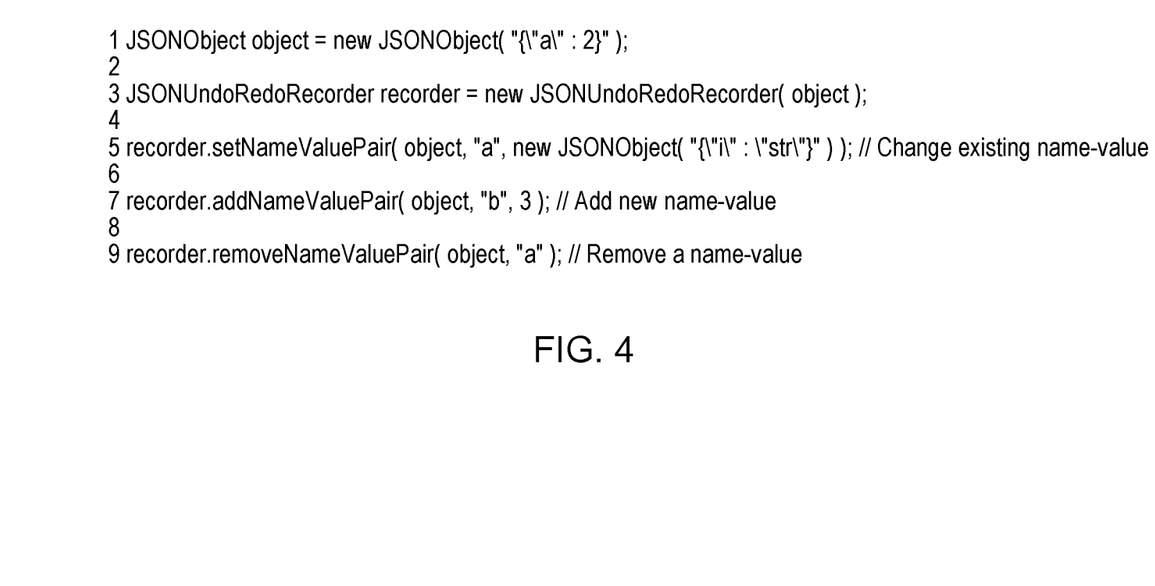
FIG. 4 represents an example of code utilized, in accordance with an embodiment of the present invention.

In some embodiments, with regard to FIG. 3 program 200 may use JSON_ID in the second element as well when representing a change that contains objects and arrays that may have been copied to some other location in the JSON structure whose changes are being captured. When applying a change from undo or redo stack, if program 200 encounters a JSON_ID, program 200 copies that object/array as is from the JSON structure. For example, in FIG. 3 line 9 ["/JSON_ROOT/", {"b":[1,"/JSON_ROOT/a/",3,{"i":"str"}]}]. As described in a previous section, in an example "if the JSON structure is changed using the API for undoing a previous change (e.g., undo( ) API that applies a change stored in the undo stack), then details for reversing the change are stored in the redo stack." In an example in FIG. 3, program 200 records removal of name-value pair named "b" to the redo stack during processing of undo operation on line 11 (e.g., entry ["/JSON_ROOT/",{"REMOVE_NAME":"b"}] on the redo stack). In another example, "if the JSON structure is changed using the API for redoing a change that was previously undone (e.g., redo( ) API that applies a change stored in the redo stack), then details for reversing the change are stored in the undo stack." In an example in FIG. 3, during processing of redo operation at line 13, program 200 copies the JSON array named "b" to the undo stack (e.g., entry ["/JSON_ROOT/",{"b":[1,"/JSON_ROOT/a/", 3,{"i":"str" }]}] on the undo stack).

In some embodiments, a user may invoke an API via a user interface (not depicted) which displays the undo-redo changes captured in the stacks before or after applying the changes. In some embodiments, program 200 may not apply the changes but rather store the captured changes in a database (e.g., database 140). In an example, the program 200 captured multiple changes to the JSON structure via in memory programmatic representations in the undo and redo stacks that also use JSON format, which are displayed in a string representation to a user via a user interface. The user may then either select to apply the changes to the JSON structure, to store the changes as a string representation, or not apply the changes.

Figure 5:
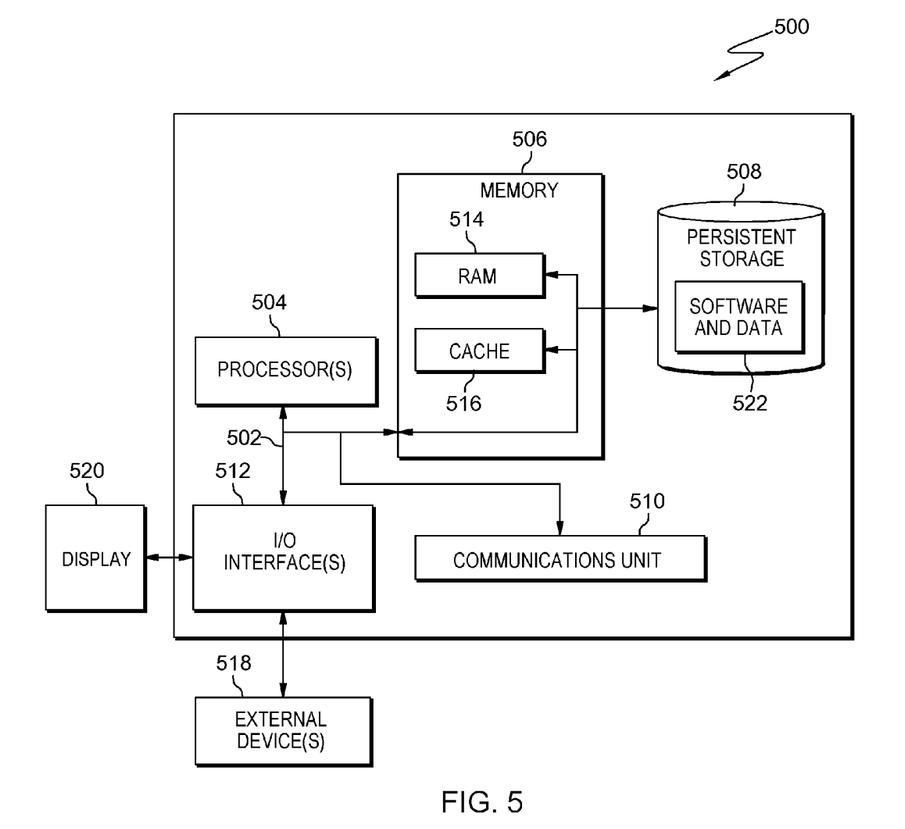
FIG. 5 depicts a block diagram of components of a test device and a server of FIG. 1, in accordance with an embodiment of the present invention.

FIG. 5 depicts a block diagram of components of computer 500, which is representative of server 102, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications, and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media. Software and data 522 are stored in persistent storage 508 for access and/or execution by processor(s) 504 via one or more memories of memory 506. With respect to server 102, software and data 522 undo/redo program 120 and database 140.

In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface(s) 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data 522 can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for undoing and redoing changes in a Javascript object notation structure, the method comprising:
    modifying, by one or more computer processors, a Javascript object notation structure to include a tag on at least one object and a tag on at least one array containing a first version of the Javascript object notation structure, wherein modifying a Javascript object notation structure to include a tag comprises:
        recursively traversing, by one or more computer processors, objects and arrays inside the hierarchy of the Javascript object notation structure; and
        adding, by one or more computer processors, an identifier to each object and array;
    identifying, by one or more computer processors, a change to the Javascript object notation structure creating a second version of the JSON structure;
    adjusting, by one or more computer processors, the tag on the at least one object and the tag on the at least one array to include the second version of the Javascript object notation structure, wherein adjusting the tag to include the second version of the Javascript object notation structure comprises storing, by one or more computer processors, details for reversing the change to the Javascript object notation structure in an undo stack and a redo stack;
    adjusting, by one or more computer processors, the displayed first version of the Javascript object notation structure with the second version of the Javascript object notation structure;
    receiving, by one or more computer processors, data indicating an action, wherein an action includes a undo/redo action to the Javascript object notation structure to return the second Javascript object notation structure to the first version of the Javascript object notation structure;
    adjusting, by one or more computer processors, the displayed second version of the Javascript object notation structure to the first version of the Javascript object notation structure, wherein adjusting the displayed second version of the Javascript object notation structure to the first version of the Javascript object notation structure comprises utilizing, by one or more computer processors, the stored details for reversing the change to the Javascript object notation structure in the undo stack and the redo stack; and
    receiving, by one or more computer processors, data indicating an action, wherein an action includes displaying the second version of the Javascript object notation structure to replace the first version of the Javascript object notation structure.

* * * * *